United States Patent
Bowes et al.

(10) Patent No.: US 9,112,833 B2
(45) Date of Patent: Aug. 18, 2015

(54) COMPRESSION OF CONTENT PATHS IN A DIGITAL CERTIFICATE

(71) Applicant: Red Hat, Inc., Raleigh, NC (US)

(72) Inventors: James Bowes, Dartmouth (CA); Vincent B. Batts, Raleigh, NC (US); William Poteat, Raleigh, NC (US)

(73) Assignee: Red Hat, Inc., Raleigh, NC (US)

( * ) Notice: Subject to any disclaimer, the term of this patent is extended or adjusted under 35 U.S.C. 154(b) by 274 days.

(21) Appl. No.: 13/875,092

(22) Filed: May 1, 2013

(65) Prior Publication Data

US 2014/0330986 A1 Nov. 6, 2014

(51) Int. Cl.

| | |
|---|---|
| *H03M 7/40* | (2006.01) |
| *H04L 29/06* | (2006.01) |
| *H04L 12/701* | (2013.01) |
| *G06F 3/0481* | (2013.01) |

(52) U.S. Cl.
CPC .............. *H04L 69/04* (2013.01); *G06F 3/0481* (2013.01); *H03M 7/40* (2013.01); *H04L 29/06* (2013.01); *H04L 29/0604* (2013.01); *H04L 45/00* (2013.01)

(58) Field of Classification Search
CPC .... H03M 7/40; G06F 3/0481; H04L 29/0604; H04L 29/06; H04L 45/00
USPC ...................... 341/65; 715/853, 854; 709/247; 370/392
See application file for complete search history.

(56) References Cited

U.S. PATENT DOCUMENTS

| | | | |
|---|---|---|---|
| 7,908,317 B2 | 3/2011 | Musson | |
| 2009/0172602 A1* | 7/2009 | Chusing et al. | ............... 715/853 |
| 2010/0274786 A1 | 10/2010 | Harris et al. | |
| 2011/0173307 A1 | 7/2011 | Yu et al. | |
| 2012/0265765 A1 | 10/2012 | Tveit | |
| 2012/0290696 A1 | 11/2012 | Wu et al. | |

FOREIGN PATENT DOCUMENTS

EP 2 511 834 A1 10/2012

OTHER PUBLICATIONS

Torsten Suel and Jun Yuan, "Compressing the Graph Structure of the Web," 2009, pp. 1-10, CIS Department, Polytechnic University, Brooklyn, NY 11201, http://www.searchenginewatch.com/webmasters/features.html.

* cited by examiner

*Primary Examiner* — Joseph Lauture
(74) *Attorney, Agent, or Firm* — Haynes and Boone, LLP

(57) ABSTRACT

An example method of compressing a set of content paths includes identifying a set of content paths associated with a client. The method also includes determining a condensed path tree expressing the set of content paths. The method further includes determining a path node tree including a set of path nodes. Each path node of the set of path nodes represents from the condensed path tree a connector node including one or more segment strings as a name and one or more nodes referenced by the connector node. The method also includes encoding, based on a frequency of appearance of a segment string as a name in the set of path nodes, the set of content paths. The method further includes compressing the set of content paths. The method also includes providing a digital certificate including the compressed and encoded set of content paths.

20 Claims, 7 Drawing Sheets

COMPRESSION OF CONTENT PATHS IN A DIGITAL CERTIFICATE

BACKGROUND

More and more data are being transmitted across networks such as the Internet. Contemporary data processing activities often produce, manipulate, or consume large quantities of data. Storing and transferring this data can be a challenging undertaking.

One approach that is frequently productive is to compress the data so that it consumes less space and can be transmitted over a given communication channel more quickly. Data compression algorithms identify redundant or inefficiently-coded information in an input data stream and re-encode it to be represented by fewer bits.

BRIEF SUMMARY

The present disclosure generally relates to data compression, and more particularly to compression of content paths. Methods, systems, and techniques for compression of content paths are provided.

According to an embodiment, a system for compressing content paths includes a content path module that identifies a set of content paths associated with a client. Each content path of the set of content paths includes a set of segment strings that is hierarchically structured. The system also includes a path tree module that determines a condensed path tree expressing the set of content paths and that determines a path node tree including a set of path nodes. Each path node of the set of path nodes represents a connector node, and the connector node includes one or more segment strings as a name and one or more references to one or more path nodes. The system further includes an encode module that encodes, based on a frequency of appearance of a segment string as a name in the set of path nodes, the set of content paths. The system also includes a compress module that compresses the set of content paths. The system further includes a certificate module that provides a digital certificate including the compressed and encoded set of content paths.

According to another embodiment, a method of compressing content paths includes identifying, by one or more processors, a set of content paths associated with a client, each content path of the set of content paths including a set of segment strings that is hierarchically structured. The method also includes determining a condensed path tree expressing the set of content paths. The method further includes determining a path node tree including a set of path nodes. Each path node of the set of path nodes represents a connector node, and the connector node includes one or more segment strings as a name and one or more references to one or more path nodes. The method also includes encoding, based on a frequency of appearance of a segment string as a name in the set of path nodes, the set of content paths. The method further includes compressing the set of content paths. The method also includes providing a digital certificate including the compressed and encoded set of content paths.

According to another embodiment, a non-transitory machine-readable medium includes a plurality of machine-readable instructions that when executed by one or more processors are adapted to cause the one or more processors to perform a method including identifying, by one or more processors, a set of content paths associated with a client, each content path of the set of content paths including a set of segment strings that is hierarchically structured; determining a condensed path tree expressing the set of content paths; determining a path node tree including a set of path nodes, each path node of the set of path nodes representing a connector node, and the connector node including one or more segment strings as a name and one or more references to one or more path nodes; encoding, based on a frequency of appearance of a segment string as a name in the set of path nodes, the set of content paths; compressing the set of content paths; and providing a digital certificate including the compressed and encoded set of content paths.

BRIEF DESCRIPTION OF THE DRAWINGS

The accompanying drawings, which form a part of the specification, illustrate embodiments of the invention and together with the description, further serve to explain the principles of the embodiments. In the drawings, like reference numbers may indicate identical or functionally similar elements. The drawing in which an element first appears is generally indicated by the left-most digit in the corresponding reference number.

DETAILED DESCRIPTION

Figure 1:
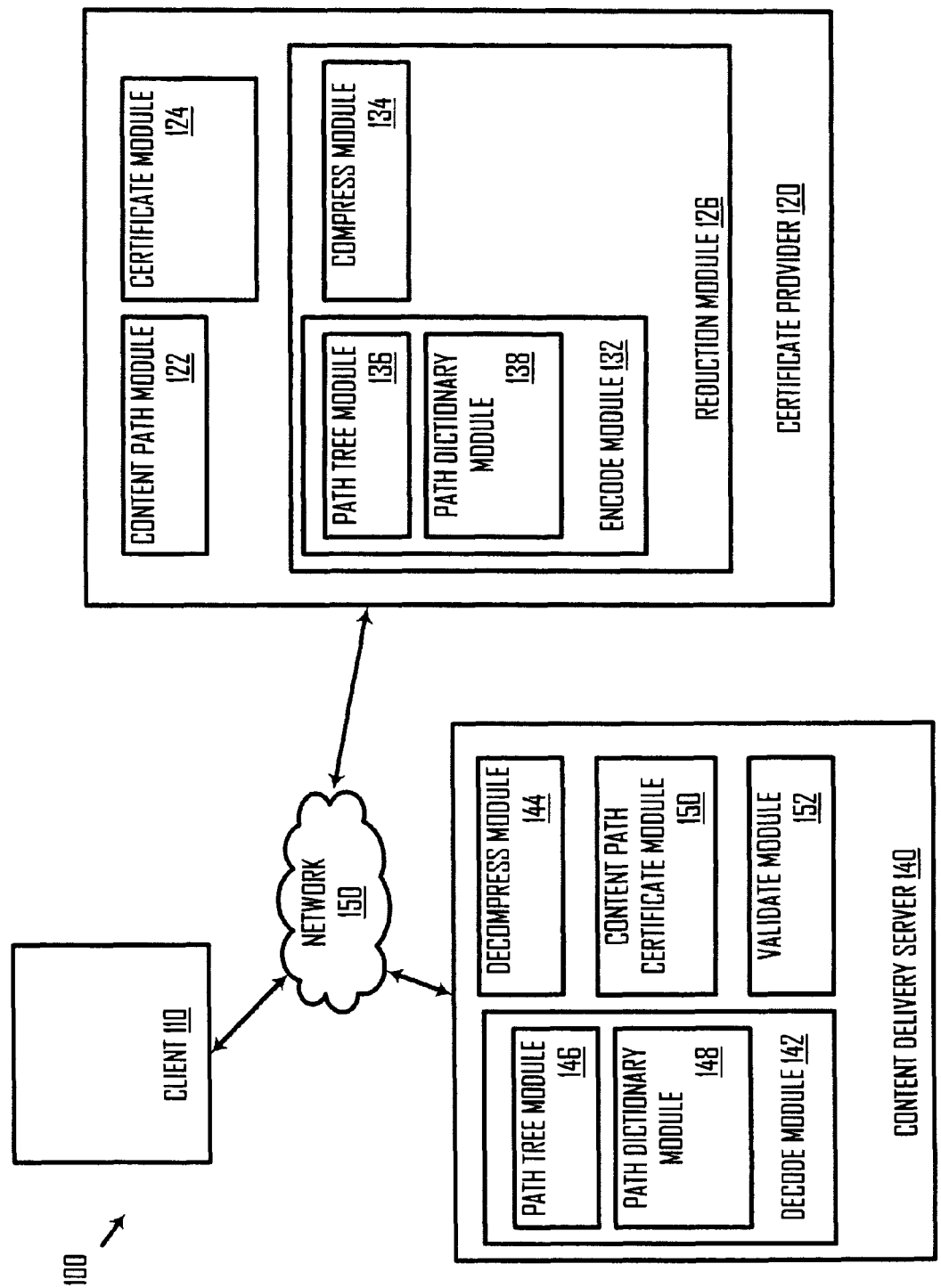
FIG. 1 is a simplified block diagram illustrating a system for compressing a set of content paths, according to an embodiment.

I. Overview
II. Example System Architecture
   A. Content Paths
   B. Reduce Size of Content Path Representation
III. Path Trees
   A. Full Path Tree Based on the Set of Content Paths
   B. Condensed Path Tree Based on the Set of Content Paths
IV. Encode the Set of Content Paths
   A. Path Dictionary
   B. Segment List Tree
   C. Path Node Tree
   D. Node Dictionary
V. Provide the Digital Certificate
VI. Validate Digital Certificate
VII. Example Method
VIII. Example Computing System
I. Overview It is to be understood that the following disclosure provides many different embodiments, or examples, for implementing different features of the present disclosure. Some embodiments may be practiced without some or all of these specific details. Specific examples of components, modules, and arrangements are described below to simplify the present disclosure. These are, of course, merely examples and are not intended to be limiting.

A certificate provider may offer to a client device content that is delivered via a content delivery server. The content delivery server may be a global distributed mesh of servers around the world that routes a client request to a server that is physically close to the client device. In this way, the content delivery server may ensure that the content is provided to the client as quickly and reliably as possible.

In an example, the client device may be associated with a product purchase (e.g., operating system software) associated with the certificate provider. The product may be mapped to a set of software repositories accessible via a content path such as a uniform resource identifier (URI). The certificate provider may keep track of a set of content paths that the client device has permission to access (e.g., the content path associated with the purchased product). The certificate provider may provide to the client device the set of content paths to which the client device has permission to access, and the client device may then send the set of content paths to the content delivery server to access content associated with the set of content paths. Content that is associated with a content path may be the content that is identified or referenced by the content path.

The certificate provider and the content delivery server may be segregated. In particular, the application residing in the content delivery server that validates the request may be separate from the application residing in the certificate provider that grants permission to the client device to access the content associated with the set of content paths. Accordingly, the certificate provider may have a desire to provide the content delivery server with information regarding whether the client device has access to a particular content path and to identify the client device. In this way, the certificate provider may prevent the client device from accessing content (e.g., by downloading a product) that the client device has not purchased.

In an example, the certificate provider may include in a digital certificate the set of content paths to which the client device has access, and the client device may provide the digital certificate to the content delivery server. The content delivery server may validate the request by determining which content paths in the digital certificate the client device has permission to access and may then grant the client device permission to access the permitted content paths.

In another example, the client device may provide the content delivery service with the client provided digital certificate. The digital certificate may include the compressed content paths, such that the content delivery service can validate authenticity of the request (e.g., the "issuer" of the digital certificate).

The set of content paths may consume a large amount of data. As such, it may be desirable to compress the set of content paths in the digital certificate before the digital certificate is sent to the content delivery server. This may be desirable if, for example, the content delivery server accepts digital certificates of a maximum size and rejects digital certificates that are larger than the maximum size. If the client request is associated with a large quantity of content paths, the placement of the content paths in the digital certificate may exceed the maximum size. It may be frustrating for a user (e.g., company) associated with the client device if the products to which the client device is entitled to access are not provided by the content delivery server because the digital certificate exceeds the maximum size.

It may be desirable to reduce the size of the amount of data representing the set of content paths in the digital certificate such that the whole set of content paths may be easily included in the digital certificate without exceeding the maximum size. Further, it may be quicker to transmit the compressed data over a network.

The certificate provider may encode and compress the set of content paths, place the encoded and compressed set of content paths in the digital certificate, and provide to the client device the digital certificate. The client device may receive the digital certificate and store it locally. To access the content associated with the set of content paths, the client device may provide the digital certificate to the content delivery server. The content delivery server may decode and uncompress the set of content paths in the digital certificate and allow the client device access to the permitted content paths. The present specification provides techniques to encode/decode and compress/uncompress the set of content paths.

II. Example System Architecture

FIG. 1 is a simplified block diagram 100 illustrating a system for compressing a set of content paths, according to an embodiment.

Diagram 100 includes a client 110, certificate provider 120, and content delivery server 140 coupled to a network 150. Each of client 110, certificate provider 120, and content delivery server 140 may communicate with each other via network 150.

It should be understood that client device 110 may be a client in terms of sending a request to the certificate provider and/or the content delivery server, and may also be a server that receives requests from other client devices and serves content to the other client devices based on their requests. In an example, client 110 may be a server located in a datacenter, and client 110 may be registered to receive software updates, bug fixes, security patches, and/or security releases.

Network 150 may include various configurations and use various protocols including the Internet, World Wide Web, intranets, virtual private networks, wide area networks, local networks, private networks using communication protocols proprietary to one or more companies, cellular and other wireless networks, Internet relay chat channels (IRC), instant messaging, simple mail transfer protocols (SMTP), Ethernet, WiFi and hypertext transfer protocol (HTTP), and various combinations of the foregoing.

A. Content Paths

Certificate provider 120 includes a content path module 122 and a certificate module 124. In an embodiment, content path module 122 identifies a set of content paths associated with a client request. In an example, client 110 has subscribed to one or more products and the certificate provider 120 queries a database to determine to which products client 110 has subscribed. The one or more products may be accessible over network 150 via a set of content paths. Certificate provider 120 may identify the set of content paths that is associated with the one or more products to which client 110 has subscribed and to which client 110 has permission to access.

In an example, client 110 accesses the set of content paths by viewing (e.g., on a computer screen) the content associated with the set of content paths. Client 110 may also access the set of content paths by downloading the content associated with the set of content paths. In an example, a content path is a URI, and client 110 may download the content associated with the URI via content delivery server 140. The content associated with the URI may be, for example, operating system software, software updates, security patches, middleware, and virtualization products. Client 110 may download, for example, source code or precompiled binaries that are ready to run on a production machine.

Certificate provider 120 may provide client 110 a digital certificate including the set of content paths to which client 110 has permission to access. In an example, client 110 may send a request to certificate provider 120 for the digital certificate. In another example, certificate provider 120 provides the digital certificate to client 110 based on a client request to subscribe to a product associated with the set of content paths.

To access the content associated with the set of content paths, client 110 may provide the digital certificate to content delivery server 140. Client 110 may be preconfigured to transmit the digital certificate to content delivery server 140 to access the content. The digital certificate may be any digital certificate such as an X.509 digital certificate.

For simplicity, this description may describe a content path as being a URI. This is not intended to be limiting. This description applies as well to other data that is hierarchically structured such as, for example, an XML document.

Each content path of the set of content paths may include a set of segment strings that is hierarchically structured. Table A includes an example set of content paths as illustrated below.

TABLE A prefix/content/beta/rhel/$releasever/$basearch/source/SRPMS
prefix/content/dist/jboss/source
prefix/content/beta/rhel/$releasever/$basearch/debug
prefix/content/dist/rhel/$releasever/$basearch/source/SRPMS
prefix/content/dist/rhel/$releasever/$basearch/os
prefix/content/dist/rhel/$releasever/$basearch/debug
prefix/content/beta/rhel/$releasever/$basearch/os As illustrated in Table A, the set of content paths may include a set of URIs. The first URI in Table A, "prefix/content/beta/rhel/$releasever/$basearch/source/SRPMS" includes eight segment strings. In particular, the first segment string is "prefix," the second segment string is "content," the third segment string is "beta," and so on. Further, the first URI is hierarchically structured into one or more parent segment strings and one or more child segment strings. For example, "prefix" may be a parent segment string of "content," and similarly, "content" may be a child segment string of "prefix."

Certificate provider 120 may grant client 110 permission to access the content associated with the set of URIs in Table A. In particular, certificate provider 120 may inform content delivery server 140 of this permission by including the set of URIs in the digital certificate provided to client 110.

B. Reduce Size of Content Path Representation

The first URI in Table A is "prefix/content/beta/rhel/$releasever/$basearch/source/SRPMS" and may be the base path of a directory associated with a repository. Certificate provider 120 may grant client 110 access to the content associated with the base path of the directory along with all of its subdirectories by only providing the base path of the directory. Accordingly, if the digital certificate includes the base path URI, content delivery server 140 may allow client 110 to access the content associated with the base path URI along with its subdirectories.

Certificate provider 120 includes a reduction module 126. Reduction module 126 may reduce the size of data that represents the set of URIs that is included in the digital certificate. Reduction module 126 may include an encode module 132 and compress module 134. In an embodiment, encode module 132 encodes the set of content paths, and compress module 134 compresses the set of content paths. Certificate module 124 may provide the digital certificate including the compressed and encoded set of content paths to client 110. More details on the encoding/decoding and compressing/uncompressing of the set of content paths are below as well as the digital certificate that includes the set of content paths.

III. Path Trees

A. Full Path Tree Based on the Set of Content Paths

In an embodiment, encode module 132 includes a path tree module 136 and path dictionary module 138. In an embodiment, path tree module 136 decomposes one or more sets of segment strings that is hierarchically structured into parent segment strings and child segment strings and determines a path tree including a set of nodes. Each node of the set of nodes may effectively indicate a position of one or more segment strings in the set of content paths. The path tree may express the set of content paths such that the set of content paths may be recreated based on the path tree.

Figure 2:
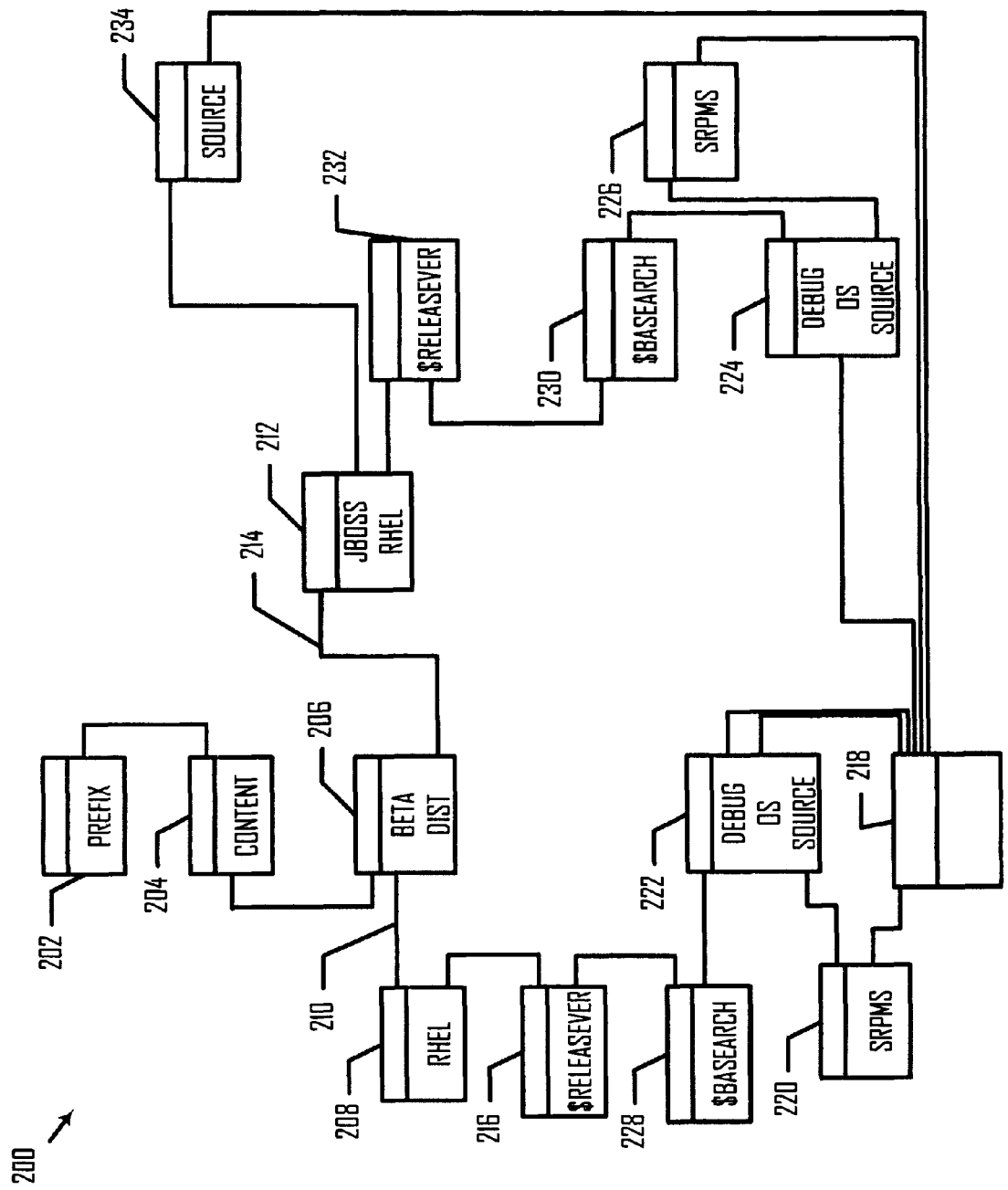
FIG. 2 is an illustration of a full path tree that expresses the set of content paths, according to an embodiment.

FIG. 2 is an illustration of a full path tree 200 that expresses the set of content paths in Table A, according to an embodiment.

In an embodiment, path tree module 136 determines path tree 200 including nodes 202-234. At least one node of path tree 200 may include one or more child segment strings, and each child segment string may reference another node of path tree 200 based on a position of the child segment string relative to other child segment strings in the set of content paths. A first node that references a second node may be the parent node of the second node. Likewise, the second node that is referenced by the first node may be the child node of the first node.

In FIG. 2, a node 202 includes child segment string "prefix" and references node 204, which includes child segment string "content." In the set of URIs in Table A, each URI that starts with "prefix" has a child segment string "content." Accordingly, "prefix" is the parent segment string of "content," and node 202 including "prefix" references a node 204 including "content."

Similarly, node 204 references a node 206, which includes child segment strings "beta" and "dist." In the set of URIs in Table A, each URI that starts with "prefix/content" has either child segment string "beta" or "dist." Accordingly, node 204 including "content" references node 206 including "beta" and "dist."

Further, node 206 references two different nodes. Segment string "beta" in node 206 references a node 208, which includes child segment string "rhel," along a path 210. In the set of URIs in Table A, each URI that starts with "prefix/content/beta" has child segment string "rhel." Accordingly, "beta" in node 206 references node 208 including "rhel" along path 210.

Likewise, segment string "dist" in node 206 references a node 212, which includes child segment strings "jboss" and "rhel," along a path 214. In the set of URIs in Table A, each URI that starts with "prefix/content/dist" has either child segment string "jboss" or "rhel." Accordingly, "dist" in node 206 references node 212 including "jboss" and "rhel." Similar logic may be implemented on the remaining segment strings in the set of URIs in Table A to determine the rest of the nodes in path tree 200.

Path tree 200 may express the set of URIs in Table A such that the set of URIs may be recreated based on path tree 200. For example, following a path from node 202 including "prefix" to node 204 including "content" to node 206 including "beta" to node 208 including "rhel" to node 216 including "/$releasever" to node 228 including "/$basearch" to node 222 including "source" to node 220 including "SRPMS" may indicate the first URI in Table A, which is "prefix/content/beta/rhel/$releasever/$basearch/source/SRPMS."

Further, the last segment string in each URI references a terminal node 218 of path tree 200. For example, the last segment string of the first URI in Table A is "SRPMS" included in node 220 to determine a condensed path tree, and node 220 references terminal node 218.

In an embodiment, from the tail end of path tree 200, path tree module 136 identifies one or more duplicate subtrees in path tree 200, removes each duplicate subtree, and points all references from the duplicate subtree to the corresponding nodes in the corresponding subtree. The duplicate subtrees may be merged from the tail end of path tree 200.

Identifying duplicate subtrees from the tail end of path tree 200 may eliminate a great deal of recursion that includes recursing path tree 200 from the front end to the tail end to find the duplicate subtrees. It may be faster to identify duplicate subtrees starting from the tail end of the path tree. Further, the duplicate subtrees may be an unnecessary redundancy in path tree 200 that may be removed to further reduce an expression of the set of content paths. Additionally, less memory may be used to transmit the expression of the set of content paths.

To identify duplicate subtrees, path tree module 136 may determine whether two different paths including terminal node 218 have the same parent nodes in quality. For example, from the tail end of path tree 200, terminal node 218 has four parent nodes 220, 222, 224, and 226. Of the four parent nodes, terminal node 218 has two parent nodes that include the same set of child segment strings. In particular, nodes 220 and 226 include segment string "SRPMS" and reference terminal node 218. Accordingly, terminal node 218 has the same two parent nodes in quality, and a first path from node 220 to terminal node 218 and a second path from node 222 to terminal node 218 may be identified as being duplicate subtrees.

Going up the path tree, each of nodes 220 and 226 has a parent node 222, 224 that includes the same set of child segment strings including "debug," "os," and "source." Accordingly, nodes 220 and 226 have the same two parent nodes in quality. A first path from node 222 including an above duplicate subtree (e.g., node 220 to terminal node 218) and a second path from node 224 including the other duplicate subtree (e.g., node 226 to terminal node 218) may be identified as being duplicate subtrees.

Similarly going up the path tree, each of nodes 222 and 224 has a parent node 228, 230 that includes the same set of child segment strings including "basearch." Accordingly, nodes 222 and 224 have the same two parent nodes in quality. A first path from node 228 including an above duplicate subtree (e.g., node 222 to node 220 to terminal node 218) and a second path from node 230 including the other duplicate subtree (e.g., node 224 to node 226 to terminal node 218) may be identified as being duplicate subtrees.

Similarly going up the path tree, each of nodes 228 and 230 has a parent node 216, 232 that includes the same set of child segment strings including "$releasever." Accordingly, nodes 228 and 230 have the same two parent nodes in quality. A first path from node 216 including an above duplicate subtree (e.g., node 228 to node 222 to node 220 to terminal node 218) and a second path from node 232 including the other duplicate subtree (e.g., node 230 to node 224 to node 226 to terminal node 218) may be identified as being duplicate subtrees.

In contrast, going up the path tree, each of nodes 216 and 232 has a parent node that includes a different set of child segment strings. For example, node 216 has a parent node 208 that includes segment string "rhel," and node 232 has a parent node 212 that includes segment strings "jboss" and "rhel." Accordingly, nodes 216 and 232 do not have the same two parent nodes in quality. A first path from node 216 including an above duplicate subtree (e.g., node 228 to node 222 to node 220 to terminal node 218) and a second path from node 212 including the other duplicate subtree (e.g., node 232 to node 230 to node 224 to node 226 to terminal node 218) may be identified as not being duplicate subtrees.

B. Condensed Path Tree Based on the Set of Content Paths

Figure 3:
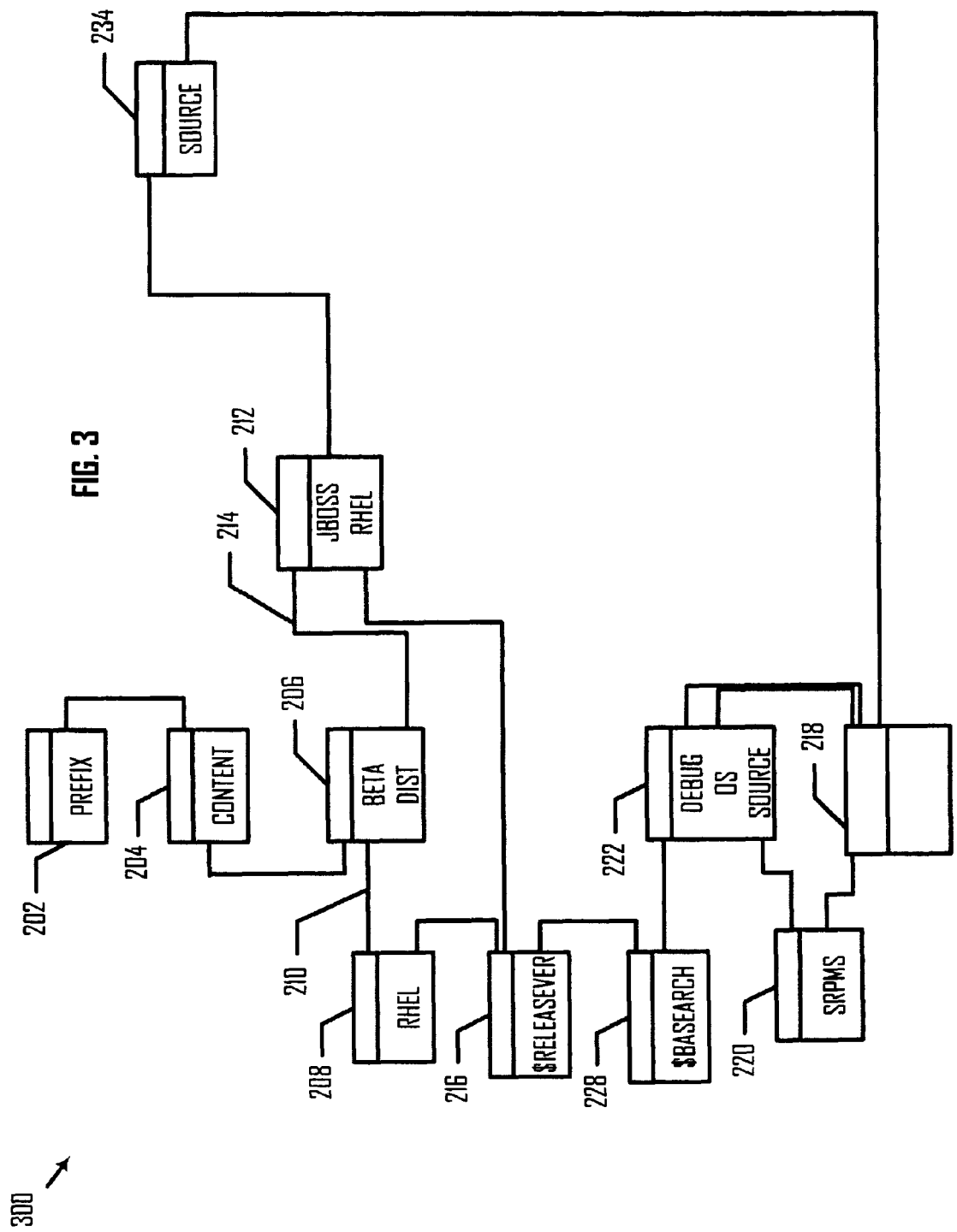
FIG. 3 is an illustration of a condensed path tree based on eliminating from a tail of the full path tree one or more duplicate subtrees, according to an embodiment.

FIG. 3 is an illustration of a condensed path tree 300 based on eliminating from the tail end of path tree 200 one or more duplicate subtrees. Accordingly, each node in condensed path tree 300 may include one or more child segment strings, and condensed path tree 300 may be devoid of duplicate subtrees.

Path tree module 136 may identify a first subtree including a first path including node 216 to terminal node 218 and a second subtree including a second path including node 232 to terminal node 218 that are duplicates, remove one of the duplicate subtrees, and point all references from the removed duplicate subtree to the corresponding nodes in the remaining duplicate subtree. In FIG. 2, "rhel" in node 212 referenced node 232 including "$releasever." After path tree 200 has been condensed by removing the duplicate subtree, the reference from "rhel" in node 212 is rearranged to reference node 216 including "$releasever" in FIG. 3.

Condensed path tree 300 may express the set of URIs in Table A such that the set of URIs may be recreated based on condensed path tree 300. Accordingly, the content represented by path tree 200 is equivalent to the content represented by condensed path tree 300.

IV Encode the Set of Content Paths

A. Path Dictionary

Referring back to FIG. 1, path dictionary module 138 may determine a path dictionary including a list of segment strings ordered by a frequency of appearance of each segment string in condensed path tree 300. In condensed path tree 300, each of the segment strings included in the nodes appear once with the exception of "rhel" (e.g., in nodes 208 and 212) and "source" (e.g., in nodes 222 and 234). Segment strings "rhel" and "source" appear twice and accordingly may appear at the end of the path dictionary.

Based on condensed path tree 300, an example path dictionary may include the ordered list of segment strings "content, os, SRPMS, prefix, debug, $releasever, beta, jboss, $basearch, dist, source, rhel." The example path dictionary includes each segment string in path tree 300, and each segment string in the path dictionary is unique. A segment string ordered closer to the beginning of the path dictionary may have a lower frequency of appearance (or be tied with the lowest frequency of appearance) in path tree 300 compared to a subsequently ordered segment string in the path dictionary. Accordingly, the segment strings located near the end of the path dictionary are in condensed path tree 300 the most.

In an embodiment, the path dictionary is an encoded list of null terminated strings, and the strings are ordered by frequency of appearance, beginning with the least frequently seen string. Additionally, the encoded list of null terminated strings may be DEFLATE encoded, specifying an end of stream sentinel. In this way, it may be unnecessary to demarque the end of this section. The path dictionary may be compressed and included in the digital certificate.

The condensed path tree (e.g., condensed path tree 300) and path dictionary may be used to encode the set of content paths. The path dictionary may be used to construct a segment list tree and a path node tree. The segment list tree and path node tree may then be used to encode the set of content paths and determines a node dictionary. Each of the segment list tree, node path tree, and node dictionary are described in turn.

B. Segment List Tree

A segment list tree may include a set of nodes, each node representing a segment string in the path dictionary or a sentinel node indicating an end-of-node. Each segment string in the path dictionary may be represented by a node in the segment list tree. The segment list tree may also include a sentinel node.

Figure 4:
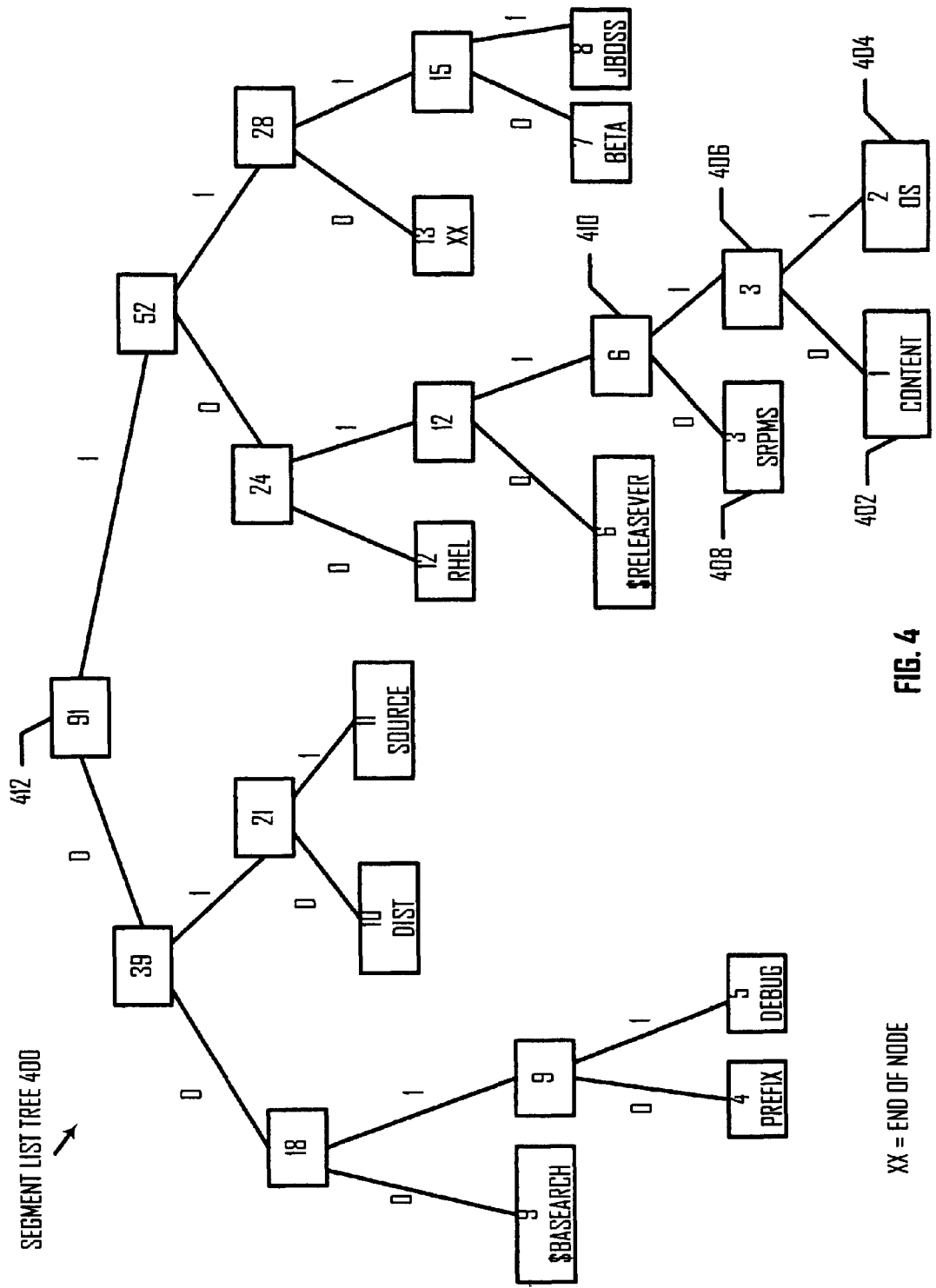
FIG. 4 is an illustration of a segment list tree, according to an embodiment.

FIG. 4 is an illustration of a segment list tree 400, according to an embodiment.

A quantity of nodes in the segment list tree may be based on the quantity of segment strings in the path dictionary. In an embodiment, the quantity of nodes in the segment list tree is equal to the quantity of segment strings in the path dictionary plus an additional node that includes the sentinel node that is an end-of-node marker. In an example, encode module 132 identifies 12 segment strings in the example path dictionary "content, os, SRPMS, prefix, debug, $releasever, beta, jboss, $basearch, dist, source, rhel," and determines that segment list tree 400 has 13 nodes (12 nodes from the path dictionary plus the additional end-of-node marker).

Encode module 132 may determine, based on the path dictionary and the quantity of nodes in the path dictionary, the segment list tree. In an example, encode module 132 constructs the segment list tree based on an order of the segments strings in the path dictionary. In an embodiment, the order of the segment string in the path dictionary is fed into a Huffman coding algorithm to determine the segment list tree.

Encode module 132 may apply a variety of algorithms based on frequency of appearance of a segment string in condensed path tree 30. In an example, encode module 132 applies the Huffman algorithm to the path dictionary, and an arbitrary weight may be assigned to a segment string based on the segment string's position in the path dictionary. In an embodiment, one segment string is assigned a higher weight than another segment string, and the sentinel node is assigned the highest weight compared to the weights assigned to the other segment strings in the path dictionary. The Huffman algorithm may be based on a frequency of appearance of a segment string in condensed path tree 300 relative to other segment strings in condensed path tree 300.

In an example, the path dictionary has N segment strings, and the arbitrary weight is from one to N, where N is a whole number greater than zero. For instance, for the example path dictionary, "content, os, SRPMS, prefix, debug, $releasever, beta, jboss, $basearch, dist, source, rhel," the first segment string "content" may be assigned a weight of one (indicated by a "1" in node 402), the second segment string "os" may be assigned a weight of two (indicated by a "2" in node 404), the third segment string "SRPMS" may be assigned a weight of three (indicated by a "3" in node 408), and so on with the remaining segment strings. Sentinel node 420 is assigned a weight of thirteen, the highest weight compared to the weights assigned to the other segment strings in the path dictionary.

Encode module 132 may construct the shape of segment list tree 400 without yet filling in the nodes. Because encode module 132 knows the quantity of segments strings in the path dictionary, encode module 132 knows how many nodes to construct for segment list tree 400 (e.g., number of segment strings in path dictionary plus one for end-of-node marker).

Path tree module 136 may identify the first two segment strings in the path dictionary, place each identified segment string in a node, and pair them together with the same parent node. The weight of the paired nodes may be added together to determine a weight of the parent node. The paired nodes may then be removed from the segment strings to select from and the next segment string is paired together with the lowest weighted node. This may continue to happen until all segment strings in the path dictionary has been used.

For example, in segment list tree 400, node 402 includes the first segment string "content" having an assigned weight of one, and node 404 includes the second segment string "os" having an assigned weight of two. Nodes 402 and 404 may be paired together with a same parent node 406, which references nodes 402 and 404. The weight of nodes 402 and 404 may be added together to determine the weight of parent node 406, which is three (1+2). Similar logic may be applied to the remaining segment strings in the path dictionary, resulting in the nodes and connections of segment list tree 400.

Further, each reference to the left of a node may have a code of "0," and each reference to the right of a node may have a code of "1." For example, node 406 has a left reference to node 402 and the path from node 406 to node 402 has a code of "0," and node 406 has a right reference to node 404 and the path from node 406 to node 404 has a code of "1." Similar logic may be applied to the remaining references, resulting in segment list tree 400.

The path dictionary may be encoded with a variable-length bit string that is assigned to each segment string and that unambiguously represents the segment string. In an embodiment, the path dictionary is encoded using segment list tree 400. The encoding for each segment string has a unique prefix and is determined by following a path in path tree 400 from a root node 412 to the node including the particular segment string of interest. The encoding is the bit string of symbols on each branch followed.

In an example, "content" is encoded by determining the bits along the path from root node 412 to node 402. In particular, "content" is encoded as "101110" because from root node 412 to node 402, the path takes a right reference (1), a left reference (0), three right references (111), and a left reference (0) to reach node 402. Similarly, the second segment string in the path dictionary is "os," which is included in node 404 of segment list tree 400. Segment string "os" is encoded by determining the bits along the path from root node 412 to node 404. In particular, "os" is as "101111" because from root node 412 to node 404, the path takes a right reference (1), a left reference (0), and four right references (1111). Similar logic may be applied to determine the encoding for each of the segment strings in the path dictionary.

Table B includes the encodings for each segment string as illustrated below.

TABLE B

| Segment String | Encoded bits |
| --- | --- |
| content | 101110 |
| os | 101111 |
| SRPMS | 10110 |
| prefix | 0010 |
| debug | 0011 |
| $releasever | 1010 |
| beta | 1110 |
| jboss | 1111 |
| $basearch | 000 |
| dist | 010 |
| source | 011 |
| rhel | 100 |
| sentinel marker | 110 |

The path dictionary "content, os, SRPMS, prefix, debug, $releasever, beta, jboss, $basearch, dist, source, rhel" may be encoded using segment list tree 400, and the encoded bits representing the path dictionary may be placed in the digital certificate. Thus, the encoded bit string representing the path dictionary may be "1011101011-1110110001000111010111011111000010011100." The bit strings in the path dictionary may be encapsulated into bytes.

In segment list tree 400, the path to a node representing a segment string that appears a first quantity of times in path tree 300 may be shorter than a path to another node representing a segment string that appears a second quantity of times in path tree 300, where the first quantity is greater than the second quantity. This may further reduce the size of the data needed to represent the path dictionary. In the above example, the segment strings with the highest frequency of appearance in segment list tree 400 ("rhel" and "source") have encodings with fewer bit strings (e.g., three bit strings) compared to other segment strings in the path dictionary.

In an embodiment, the quantity of segment strings in the path dictionary is encoded and the path dictionary is compressed and placed in the digital certificate that is provided to client 110. Given the quantity of segment strings in the path dictionary and the path dictionary, content delivery server 140 may effectively reconstruct segment list tree 400.

C. Path Node Tree

A path node tree may include a set of path nodes, each path node defining a connector node from condensed path tree 300 and the connector node's connections. Encode module 132 may construct the path node tree based on condensed path tree 300. In an example, path tree module 136 determines a condensed path tree expressing the set of content paths and determines a path node tree including a set of path nodes. Each path node of the set of path nodes may represent a connector node, and the connector node may include one or more segment strings as a name and one or more references to one or more path nodes.

Figure 5:
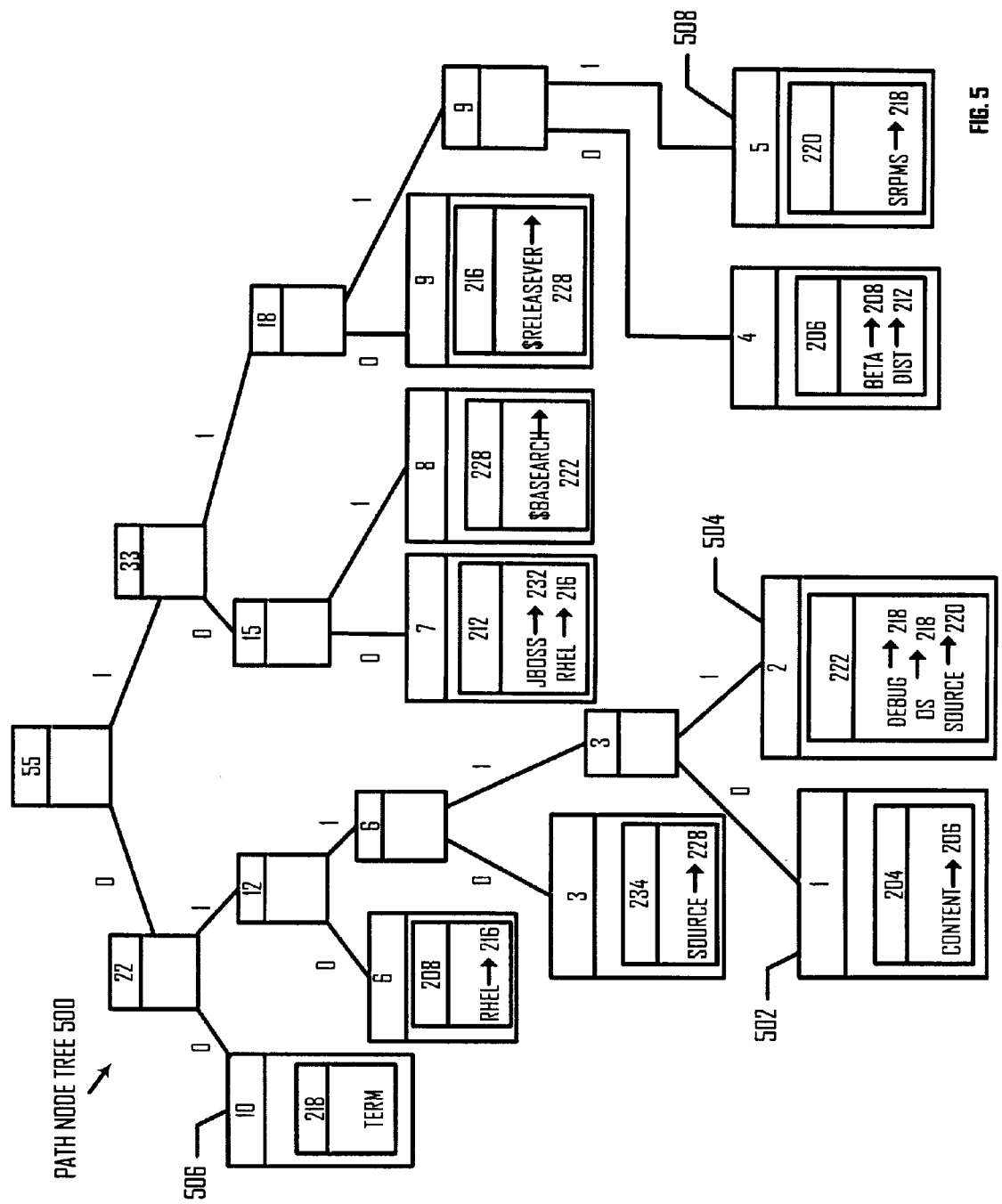
FIG. 5 is an illustration of a path node tree, according to an embodiment.

FIG. 5 is an illustration of a path node tree 500, according to an embodiment.

Each of the path nodes in path node tree 500 includes an outer node having an arbitrary weighting. In an embodiment, one outer node will be assigned a higher weight than another outer node, and the weights may be used to construct path node tree 500. In an embodiment, the weights of the path nodes are fed into a Huffman coding algorithm to determine path node tree 500. The assigned weights may range from one to the quantity of path nodes in path node tree 500. In particular, path node 502 includes a weight of one, path node 504 includes a weight of two, and so on. Similar logic may be applied to populate the outer weights of the nodes in path node tree 500 to arrive at path node tree 500.

The quantity of path nodes in path node tree 500 may be based on a quantity of nodes in path tree 300 without the root node. Path tree 300 includes 11 nodes, and path node tree 500 includes 10 nodes, one less node than path tree 300. Encode module 132 may construct the shape of path node tree 500 without yet filling in the path nodes. In particular, if encode module 132 knows how many nodes are present in path tree 300 and the arbitrary weighting, encode module 132 also knows how many path nodes to construct for path node tree 500. Further, it may be unnecessary for certificate provider 120 to send to content delivery server 140 the arbitrary weighting information. This may further reduce the amount of data in the digital certificate.

Encode module 132 may order the nodes from path tree 300 by order of reference from other nodes, from the least to the most references. This may ensure that root node 202 of path tree 300 is first, as it has no references. Root node 202 may be excluded from path node tree 500 because root node 202 is not referenced by any nodes. This may have an advantage of reducing the size of the representation of the set of content paths when it is included in the digital certificate.

Each path node in path node tree 500 may include a connector node that includes a segment string and one or more references to one or more path nodes. Path node 502 includes the segment string "content" as a name and is a connector node that references node 206 from FIG. 3 (e.g., path node 504), and this relationship is represented by path node 502 in path node tree 500.

Similarly, in FIG. 3, node 222 includes segment string "debug," "os," and "source," as a name and is a connector node that references nodes 218, 218, and 220 from FIG. 3 (e.g., path nodes 506 and 508). In particular, "debug" references terminal node 218, "os" references terminal node 218, and "source" references node 220. These relationships are represented by node 504 in path node tree 500. Path node 504 includes node 222, which includes debug" referencing terminal node 218, "os" referencing terminal node 218, and "source" referencing node 220. Here, the segment strings "debug," "os," and "source" are included as names in path node tree 500. Similar logic may be applied to populate the path nodes to arrive at path node tree 500.

Although the disclosure describes constructing segment list tree in FIG. 4 before constructing path node tree 500 in FIG. 5, it does not matter in what order encode module 132 constructs segment list tree 400 and path node tree 500. In another example, segment list tree 400 is constructed in parallel with path node tree 500.

D. Node Dictionary

In an embodiment, encode module 136 encodes condensed path tree 300 using segment list tree 400 and path node tree 500.

The node dictionary may include the encoding of condensed path tree 300 based on segment list tree 400 and path node tree 500. The node dictionary may include P entries of one or more pairs (path index, node index) and an end-of-node indicator. The path and node indices may be stored as arbitrary length bit strings (their addresses based on their positions in segment list tree 400 or path node tree 500). The end-of-node indicator may be the code for sentinel value 420 added to segment list tree 400. The sentinel value may be excluded from the node dictionary because the value does not matter; only the lookup code matters.

A path node may specify a connector node including one or more segment strings as a name and one or more nodes referenced by the connector node. In FIG. 3, each node may be a connector node that is encoded using segment list tree 400. The connector node in FIG. 3 includes one or more segment strings as a name and references one or more nodes that are represented in path node tree 500. The one or more nodes referenced by the connector may be encoded using path node tree 500. An end-of-node marker may indicate the last segment string in the node path.

In an example, in FIG. 3, node 202 is a connector node and references node 204. Node 202 includes "prefix," which is encoded with the bit string "0010" using segment list tree 400. Node 204, the node referenced by connector node 202, is encoded with the bit string "01110" using path node tree 500. Node 202 does not reference any other nodes, so an end-of-node marker may indicate the last segment string in a node path. The end-of-node marker is encoded as "110" using segment list tree 400. Thus, "001001110110" may represent this node path.

In another example, in FIG. 3, node 204 is a connector node and references node 206. Node 204 includes "content," which is encoded with the bit string "101110" using segment list tree 400. Node 206, the node referenced by connector node 204, is encoded with the bit string "1110" using path node tree 500. Node 204 does not reference any other nodes, so an end-of-node marker may indicate the last segment string in the node path. The end-of-node marker is encoded as "110" using segment list tree 400. Thus, "1011101110110" may represent this node path.

In another example, in FIG. 3, node 206 is a connector node and references nodes 208 and 212. Node 206 includes "beta," which is encoded with the bit string "1110" using segment list tree 400. Node 208, the node referenced by "beta" in connector node 206, is encoded with the bit string "010" using path node tree 500. Node 206 also includes "dist," which is encoded with the bit string "010" using segment list tree 400. Node 212, the node referenced by "dist" in connector node 206, is encoded with the bit string "010" using path node tree 500. Node 212, the node referenced by "dist" in connector node 206, is encoded with the bit string "100" using path node tree 500. Node 206 does not reference any other nodes, so an end-of-node marker may indicate the last segment string in the node path. The end-of-node marker is encoded as "110" using segment list tree 400. Thus, "1110010010100110" may represent this node path. Similar logic may be implemented on the remaining nodes to determine the encoded connector node and the nodes referenced by the connector node. The node dictionary may be included in the digital certificate. In an example, the node dictionary is parsed into bytes and included in a binary block that is included in the digital certificate.

Table C includes the encodings for nodes 202, 204, and 206 as illustrated below.

TABLE C

| Connector Node | Encoded Connector Node (FIG. 4) | Referenced Nodes (FIG. 5) |
|---|---|---|
| Node 202 | <0010> = <prefix> | <01110><110> = <node 204><EON> |
| Node 204 | <101110> = <content> | <1110><110> = <node 206><EON> |
| Node 206 | <1110> = <beta> | <010><010><100><110> = <node 208><dist><node 212><EON> |
| ... | ... | ... |

In an embodiment, the node dictionary begins with one or more bytes indicating the quantity of nodes. If the quantity includes fewer than 128 nodes, a single byte may be used, as the unsigned integer number of nodes in the node dictionary. If the quantity includes greater than 127 nodes, the first byte may be used to indicate the number of subsequent bytes used to store the node dictionary count, after discarding the most significant bit from the first byte. In an example, if 512 nodes are in the node dictionary, two bytes are used to store that information. Thus, the first byte in the node dictionary may be "10000010," indicating that the next two bytes store a 16-bit unsigned integer value. In an example, the bytes have end-padding, and knowing the quantity of nodes will ensure that the collection of nodes may end when the expected count has been reached.

V. Provide the Digital Certificate

Compress module 134 may compress the path dictionary, quantity of segment strings in the path dictionary, quantity of path nodes in the path node tree, and/or the node dictionary. In an example, compress module 134 compresses the path dictionary using the zlib library. Other compression techniques are also within the spirit and scope of the present disclosure.

Certificate module 124 may obtain a digital certificate and place the path dictionary, quantity of segment strings in the path dictionary, quantity of path nodes in the path node tree, and node dictionary in the digital certificate. Certificate module 124 may then provide the digital certificate to client 110. Certificate module 124 may obtain the digital certificate by, for example, generating the digital certificate or receiving it from another entity.

Certificate module 124 may perform further actions on the content placed in the digital certificate. In an embodiment, certificate module 124 determines a binary block including the path dictionary, quantity of segment strings in the path dictionary, and the node dictionary. Encode module 132 may encode the binary block and place the binary block in the digital certificate to be provided to client 110. In an example, the path dictionary included in the binary block may be compressed and/or encoded. In another example, the quantity of segment strings included in the binary block may be compressed and/or encoded. In another example, the quantity of path nodes in the path node tree included in the binary block may be compressed and/or encoded. In another example, the node dictionary included in the binary block may be compressed.

The digital certificate may include one or more object identifiers. In an example, certificate module 124 may provide the binary block as a value for an object identifier in the digital certificate.

Further, the digital certificate may include additional information. In an example, the digital certificate also includes an expiration date. After the digital certificate expires, client 110 may request another digital certificate from certificate provider 120. Alternatively, certificate provider 120 may be aware that client 110's digital certificate is expired or is about to expire and may send a new digital certificate to client 110. Client 110 may continue to use the digital certificate until it receives a new digital certificate or the digital certificate expires.

The digital certificate may also include a version identifier. For example, a first version of the digital certificate may indicate to content delivery server 140 that the digital certificate does not include one or more compressed and encoded content paths as described in this disclosure. In another example, a second version of the digital certificate may indicate to content delivery server 140 that the digital certificate includes one or more compressed and encoded content paths as described in this disclosure. Based on the version, content delivery server 140 may determine how to process the digital certificate to validate client 110's request.

The digital certificate may also include an authority signature. Certificate provider 120 may include a stack of software that is configured to identify its certificate authority key and use the certificate authority key that is signed by the certificate authority. The certificate authority may have authority to sign the digital certificate and create new digital certificates. Certificate provider 120 may have its own certificate authority and generate a new digital certificate and sign it. Certificate provider 120 may provide the digital certificate to client 110 such that client 110 is aware that the digital certificate has been signed by certificate provider 120. In an embodiment, content delivery server 140 validates the content provided by the certificate authority.

VI. Validate Digital Certificate

Referring back to FIG. 1, certificate provider 120 may provide the digital certificate to client 110, and client 110 may provide the client-side digital certificate to content delivery server 140 to access content identified by the content paths in the digital certificate. The digital certificate may include the path dictionary, quantity of segment strings in the path dictionary, quantity of path nodes in the path node tree, and/or the node dictionary.

Content delivery server 140 may receive the digital certificate and unpack the data in the digital certificate. Content delivery server 140 may use similar logic to the logic that was used by certificate provider 120 to pack the data in the digital certificate. Content delivery server 140, however, may perform the analog of the actions performed by certificate provider 120. For example, content delivery server 140 may decode the encoded data and uncompress the compressed data in the digital certificate.

Content delivery server 140 includes a decode module 142 and an uncompress module 144. Uncompress module 144 may uncompress the compressed data in the digital certificate. In particular, uncompress module 144 may uncompress the path dictionary, quantity of segment strings in the path dictionary, quantity of path nodes in the node path tree, and/or the node dictionary if the applicable data is compressed. In an example, the digital certificate includes a compressed path dictionary, and uncompress module 144 uncompresses the compressed path dictionary.

Decode module 142 may decode the appropriate data (e.g., encoded data) in the digital certificate. In particular, decode module 142 may decode the path dictionary, quantity of segment strings in the path dictionary, quantity of path nodes in the node path tree, and/or the node dictionary, if the applicable data is encoded. In an example, the received digital certificate may include the encoded binary block including the path dictionary, quantity of segment strings in the path dictionary, quantity of path nodes in the node path tree, and node dictionary. Decode module 142 may decode the binary block.

For content delivery server 140 to determine segment list tree 400, it may be unnecessary for certificate provider 120 to provide the segment list tree 400 built by certificate provider 120. In an example, decode module 142 may reconstruct, based on the path dictionary and quantity of segment strings in the path dictionary, segment list tree 400. In an example, if certificate provider 120 uses the Huffman algorithm to determine segment list tree 400, decode module 142 may effectively reconstruct, based on the quantity of segment strings in the path dictionary and the path dictionary, segment list tree 400. Because decode module 142 applies the arbitrary weight to the segment strings and knows the quantity of segment strings in the path dictionary, content delivery server 140 may easily determine segment list tree 400. Decode module 142 may know from the digital certificate that the quantity of segment strings in the path dictionary is 12 and reconstruct segment list tree 400 with 13 nodes (12 plus the additional sentinel value). Decode module 142 may then populate these nodes using the path dictionary.

Further, if both certificate provider 120 and content delivery server 140 are configured to add the sentinel node, it may be unnecessary to transmit the quantity of segment strings in the path dictionary with the digital certificate. This may further reduce the amount of data represented by the set of content paths compared to including the sentinel node in the digital certificate.

For content delivery server 140 to determine path node tree 500, it may be unnecessary for certificate provider 120 to provide the path node tree 500 built by certificate provider 120. In an example, decode module 142 may reconstruct, based on the node dictionary and quantity of path nodes in the path node tree, path node tree 500. In an example, decode module 142 may determine or effectively reconstruct, based on the node dictionary and quantity of path nodes in the path node tree, path node tree 500. For example, if certificate provider 120 uses the Huffman algorithm to determine path node tree 500 and decode module 142 knows from the digital certificate that the quantity of path nodes in the path node tree is 10, decode module 142 may determine that path node tree 500 has 10 nodes. Decode module 142 may then populate these nodes using the node dictionary.

In another example, decode module 142 may determine, based on the node dictionary, segment list tree 400, and path node 500, path tree 300.

Content delivery server 140 may effectively reconstruct, based on the path dictionary, quantity of segment strings in the path dictionary, and the node dictionary included in the digital certificate, the set of content paths in the digital certificate. Content delivery server 140 may traverse the values in path tree 300 to validate against a path (e.g., to determine whether a particular content path is a child (e.g., subdirectory) of another node. To determine the set of content paths, content delivery server 140 may perform a preorder tree traversal where each node iterates over its children nodes, recursively prepending that child node's segment string. Once the sentinel node is reached, the recursion returns.

Content delivery server 140 may then determine to which content paths included in the digital certificate client 110 has access and then provide client 110 access to the permitted content.

In an embodiment, validate module 152 determines which content paths a client associated with the client request has permission to access. Validate module 152 may allow the client to access content corresponding to the permitted content paths. Each content path of the set of content paths may correspond to one or more software repositories, and validate module 152 may allow the client to download software corresponding to the permitted content paths.

As discussed above and further emphasized here, FIGS. 1-5 are merely examples, which should not unduly limit the scope of the claims. For example, it should be understood that one or more modules in certificate provider 120 and/or content delivery server 140 may be combined with another module. For instance, compress module 134 and encode module 132 may be combined into one module. It should also be understood that one or more modules in certificate provider 120 and/or content delivery server 140 may be separated into more than one module. For instance, compress module 134 may be split into a first compress module and a second compress module.

Further, although one client is illustrated in FIG. 1, other embodiments having more than one client are within the scope of this disclosure. For example, a system may have M clients that have access to content associated with a set of content paths, and one or more of the M clients may receive a different digital certificate compared to other clients, where M is a number that is greater than zero. Each individual client may individually subscribe to certificate provider 120 and receive a digital certificate with the same or different set of content paths compared to another client.

Further, a big company may have hundreds of servers around the world. To reduce the transfer of data, the company may copy and store within its firewall the data associated with the content paths. In this way, it may be unnecessary for each of the company's servers to reach across network 150 to access the content associated with the set of content paths.

Additionally, for simplicity, this disclosure described the compressed set of content paths as being included in a digital certificate. This is not intended to be limiting. In another embodiment, the compressed set of content paths may be transmitted to a server without placing the compressed set of content paths in a digital certificate.

III. Example Method

Figure 6:
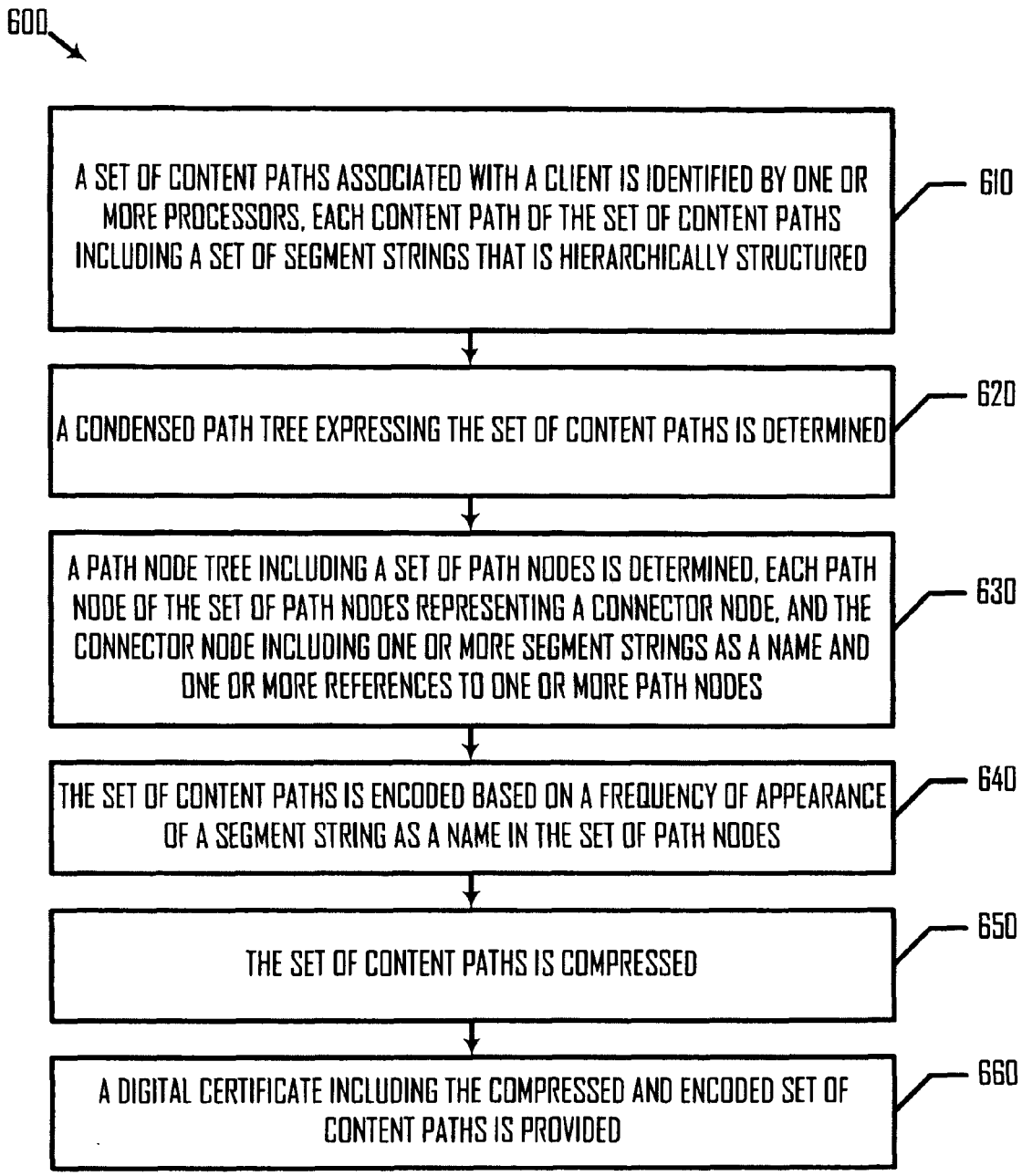
FIG. 6 is a simplified flowchart illustrating a method of compressing a set of content paths, according to an embodiment.

FIG. 6 is a simplified flowchart illustrating a method 600 of compressing content paths, according to an embodiment. Method 600 is not meant to be limiting and may be used in other applications.

Method 600 includes steps 610-640. In a step 610, a set of content paths associated with a client request is identified by one or more processors, each content path of the set of content paths including a set of segment strings that is hierarchically structured. In an example, content path module 122 identifies, by one or more processors, a set of content paths associated with a client request, each content path of the set of content paths including a set of segment strings that is hierarchically structured.

In a step 620, a condensed path tree expressing the set of content paths is determined. In an example, path tree module 136 determines a condensed path tree expressing the set of content paths.

In a step 630, a path node tree including a set of path nodes is determined, each path node of the set of path nodes representing a connector node, and the connector node including one or more segment strings as a name and one or more references to one or more path nodes. In an example, path tree module 136 determines a path node tree including a set of path nodes, each path node of the set of path nodes representing a connector node, and the connector node including one or more segment strings as a name and one or more references to one or more path nodes.

In a step 640, the set of content paths is encoded based on a frequency of appearance of a segment string as a name in the set of path nodes. In an example, encode module 132 encodes, based on a frequency of appearance of a segment string as a name in the set of path nodes, the set of content paths.

In a step 650, the set of content paths is compressed. In an example, compress module 134 compresses the set of content paths.

In a step 660, a digital certificate including the compressed and encoded set of content paths is provided. In an example, certificate module 124 provides a digital certificate including the compressed and encoded set of content paths.

It is also understood that additional method steps may be performed before, during, or after steps 610-660 discussed above. It is also understood that one or more of the steps of method 600 described herein may be omitted, combined, or performed in a different sequence as desired.

VIII. Example Computing System

Figure 7:
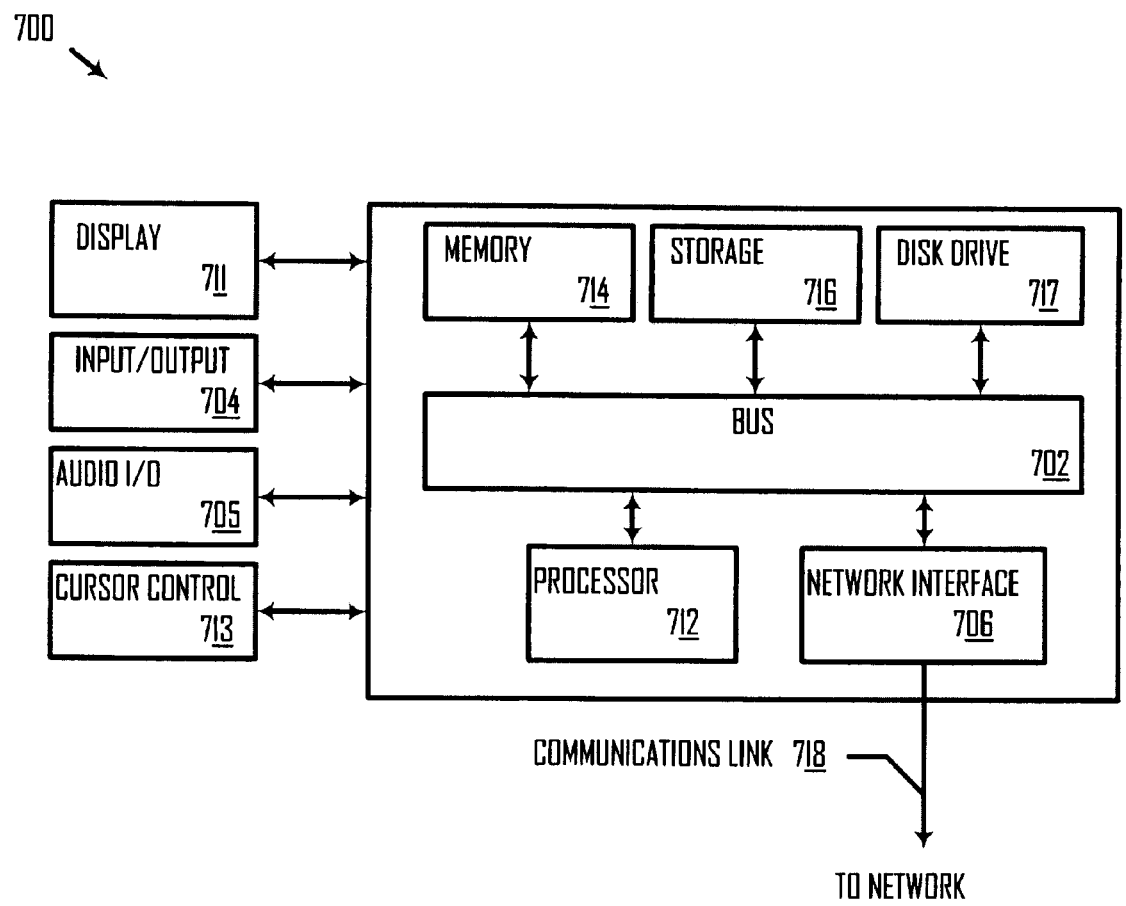
FIG. 7 is a block diagram of an electronic system suitable for implementing one or more embodiments of the present disclosure.

FIG. 7 is a block diagram of a computer system 700 suitable for implementing one or more embodiments of the present disclosure. In various implementations, client 110, certificate provider 120, and/or content delivery server 140 may run on a client and/or a server computing device. Further, client 110, certificate provider 120, and/or content delivery server 140 may be implemented in computer system 700 using hardware, software, firmware, tangible computer readable media having instructions stored thereon, or a combination thereof and may be implemented in one or more computer systems or other processing systems. Hardware, software, or any combination of such may embody any of the modules and components in FIG. 1.

The client or server computing device may include one or more processors, and may additionally include one or more storage devices each selected from a group consisting of floppy disk, flexible disk, hard disk, magnetic tape, any other magnetic medium, CD-ROM, any other optical medium, RAM, PROM, EPROM, FLASH-EPROM, any other memory chip or cartridge, and/or any other medium from which a processor or computer is adapted to read. The one or more storage devices may include stored information that may be made available to one or more computing devices and/or computer programs (e.g., clients) coupled to the client or server using a computer network (not shown). The computer programs, when executed, enable processor device 712 to implement the processes, such as the stages in the method illustrated by flowchart 600 of FIG. 6 discussed above.

Computer system 700 includes a bus 702 or other communication mechanism for communicating information data, signals, and information between various components of computer system 700. Components include an input/output (I/O) component 704 that processes a user action, such as selecting keys from a keypad/keyboard, selecting one or more buttons or links, etc., and sends a corresponding signal to bus 702. I/O component 704 may also include an output component such as a display 711, and an input control such as a cursor control 713 (such as a keyboard, keypad, mouse, etc.). An optional audio input/output component 705 may also be included to allow a user to use voice for inputting information by converting audio signals into information signals. Audio I/O component 705 may allow the user to hear audio. A transceiver or network interface 706 transmits and receives signals between computer system 700 and other devices via a communication link 718 to a network. In an embodiment, the transmission is wireless, although other transmission mediums and methods may also be suitable. A processor 712, which may be a micro-controller, digital signal processor (DSP), or other processing component, processes these various signals, such as for display on computer system 700 or transmission to other devices via communication link 718. Processor 712 may also control transmission of information, such as cookies or IP addresses, to other devices.

Components of computer system 700 also include a system memory component 714 (e.g., RAM), a static storage component 716 (e.g., ROM), and/or a disk drive 717. Computer system 700 performs specific operations by processor 712 and other components by executing one or more sequences of instructions contained in system memory component 714. Logic may be encoded in a computer readable medium, which may refer to any medium that participates in providing instructions to processor 712 for execution. Such a medium may take many forms, including but not limited to, non-volatile media, volatile media, and transmission media. In various implementations, non-volatile media includes optical, or magnetic disks, or solid-state drives, volatile media includes dynamic memory, such as system memory component 714, and transmission media includes coaxial cables, copper wire, and fiber optics, including wires that include bus 702. In an embodiment, the logic is encoded in non-transitory computer readable medium. In an example, transmission media may take the form of acoustic or light waves, such as those generated during radio wave, optical, and infrared data communications.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 700. In various other embodiments of the present disclosure, a plurality of computer systems 700 coupled by communication link 718 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also where applicable, the various hardware components and/or software components set forth herein may be combined into composite components including software, hardware, and/or both without departing from the spirit of the present disclosure. Where applicable, the various hardware components and/or software components set forth herein may be separated into sub-components including software, hardware, or both without departing from the spirit of the present disclosure. In addition, where applicable, it is contemplated that software components may be implemented as hardware components, and vice-versa.

Application software in accordance with the present disclosure may be stored on one or more computer readable mediums. It is also contemplated that the application software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Changes may be made in form and detail without departing from the scope of the present disclosure. Thus, the present disclosure is limited only by the claims.

What is claimed is:

1. A system for compressing content paths, the system comprising:
    a content path module that identifies a set of content paths associated with a client, wherein each content path of the set of content paths includes a set of segment strings that is hierarchically structured;
    a path tree module that determines a condensed path tree expressing the set of content paths and that determines a path node tree including a set of path nodes, wherein each path node of the set of path nodes represents a connector node, and wherein the connector node includes one or more segment strings as a name and one or more references to one or more path nodes;
    an encode module that encodes, based on a frequency of appearance of a segment string as a name in the set of path nodes, the set of content paths;
    a compress module that compresses the set of content paths; and
    a certificate module that provides a digital certificate including the compressed and encoded set of content paths.

2. The system of claim 1, further comprising:
    a path dictionary module that determines a path dictionary including a list of segment strings ordered by a frequency of appearance of a segment string in the condensed path tree,
    wherein to determine the condensed path tree, the path tree module decomposes the one or more sets of segment strings that is hierarchically structured into parent segment strings and child segment strings, wherein each node in the condensed path tree includes one or more child segment strings, and the condensed path tree is devoid of duplicate subtrees, and
    wherein the encode module determines, based on the quantity of segment strings in the path dictionary and the path dictionary, a segment list tree.

3. The system of claim 2, wherein the encode module determines, based on the nodes in the condensed path tree, references in the condensed path tree, and quantity of nodes in the condensed path tree, a path node tree including a set of path nodes, wherein a quantity of path nodes in the path node tree is one less than a quantity of nodes in the condensed path tree.

4. The system of claim 3, wherein the encode module determines a node dictionary by encoding, based on the segment list tree and the path node tree, the condensed path tree.

5. The system of claim 4, wherein the certificate module provides to the client the digital certificate including the quantity of segment strings in the path dictionary, quantity of path nodes in the path node tree, path dictionary, and node dictionary.

6. The system of claim 5, wherein encode module encodes the quantity of segment strings and quantity of path nodes and the compress module compresses the path dictionary, wherein the certificate module determines a binary block and provides the binary block in the digital certificate as a value for an object identifier, and wherein the binary block includes the compressed path dictionary, encoded quantity of segment strings, encoded quantity of path nodes, and the node dictionary.

7. The system of claim 2, wherein the encode module applies a Huffman algorithm to determine the segment list tree.

8. The system of claim 3, wherein the encode module applies a Huffman algorithm to determine the node path tree.

9. The system of claim 4, further comprising:
    an uncompress module that receives the digital certificate associated with a client request and uncompresses compressed data in the digital certificate;
    a decode module that determines, based on the quantity of segment strings in the path dictionary and the path dictionary specified in the received digital certificate, the segment list tree,
    wherein the decode module further determines, based on the quantity of nodes in the path node tree, node dictionary, and path dictionary specified in the received digital certificate, the path node tree,
    wherein the decode module further determines, based on the node dictionary, the segment list tree, and path node tree, the condensed path tree; and
    a content path certificate module that identifies, based on the node dictionary, a second set of content paths, wherein the first set of content paths is equivalent to the second set of content paths.

10. The system of claim 9, further comprising:
    a validate module that determines which content paths of the second set of content paths a client associated with the client request has permission to access and that allows the client to access content corresponding to the permitted content paths.

11. The system of claim 1, wherein each content path of the set of content paths corresponds to one or more software repositories, and the validate module allows the client to download software corresponding to the permitted content paths.

12. A method of compressing content paths, the method comprising:
   identifying, by one or more processors, a set of content paths associated with a client, each content path of the set of content paths including a set of segment strings that is hierarchically structured;
   determining a condensed path tree expressing the set of content paths;
   determining a path node tree including a set of path nodes, each path node of the set of path nodes representing a connector node, and the connector node including one or more segment strings as a name and one or more references to one or more path nodes;
   encoding, based on a frequency of appearance of a segment string as a name in the set of path nodes, the set of content paths;
   compressing the set of content paths; and
   providing a digital certificate including the compressed and encoded set of content paths.

13. The method of claim 12, further comprising:
   determining a path dictionary including a list of segment strings ordered by a frequency of appearance of a segment string in the condensed path tree; and
   determining, based on the quantity of segment strings in the path dictionary and the path dictionary, a segment list tree,
   wherein the determining a condensed path tree includes decomposing the one or more sets of segment strings that is hierarchically structured into parent segment strings and child segment strings, wherein each node in the condensed path tree includes one or more child segment strings, and the condensed path tree is devoid of duplicate subtrees.

14. The method of claim 13, further comprising:
   determining, based on the nodes in the condensed path tree, references in the condensed path tree, and quantity of nodes in the condensed path tree, a path node tree including a set of path nodes, wherein a quantity of path nodes in the path node tree is one less than a quantity of nodes in the condensed path tree.

15. The method of claim 14, further comprising:
   encoding, based on the segment list tree and the path node tree, the condensed path tree; and
   determining a node dictionary based on the encoding the condensed path tree.

16. The method of claim 15, wherein the providing a digital certificate includes providing to the client the digital certificate including the quantity of segment strings in the path dictionary, quantity of path nodes in the path node tree, path dictionary, and node dictionary.

17. The method of claim 16, further comprising applying the Huffman algorithm to the path dictionary, a weight of each segment string in the path dictionary being based on the position of the respective segment string in the path dictionary.

18. The method of claim 16, further comprising:
   receiving the digital certificate associated with a client request;
   uncompressing compressed data in the digital certificate;
   determining, based on the quantity of segment strings in the path dictionary and the path dictionary specified in the received digital certificate, the segment list tree,
   determining, based on the quantity of nodes in the path node tree, node dictionary, and path dictionary specified in the received digital certificate, the path node tree,
   determining, based on the node dictionary specified in the received digital certificate, the segment list tree, and path node tree, the condensed path tree; and
   identifying, based on the node dictionary, a second set of content paths, wherein the first set of content paths is equivalent to the second set of content paths.

19. A non-transitory machine-readable medium comprising a first plurality of machine-readable instructions that when executed by one or more processors is adapted to cause the one or more processors to perform a method comprising:
   identifying a set of content paths associated with a client, each content path of the set of content paths including a set of segment strings that is hierarchically structured;
   determining a condensed path tree expressing the set of content paths;
   determining a path node tree including a set of path nodes, each path node of the set of path nodes representing a connector node, and the connector node including one or more segment strings as a name and one or more references to one or more path nodes;
   encoding, based on a frequency of appearance of a segment string as a name in the set of path nodes, the set of content paths;
   compressing the set of content paths; and
   providing a digital certificate including the compressed and encoded set of content paths.

20. The non-transitory machine-readable medium of claim 19 comprising a second plurality of machine-readable instructions that when executed by one or more processors is adapted to cause the one or more processors to perform a method comprising:
   determining a path dictionary including a list of segment strings ordered by a frequency of appearance of a segment string in the condensed path tree; and
   determining, based on the quantity of segment strings in the path dictionary and the path dictionary, a segment list tree,
   wherein the determining a condensed path tree includes decomposing the one or more sets of segment strings that is hierarchically structured into parent segment strings and child segment strings, wherein each node in the condensed path tree includes one or more child segment strings, and the condensed path tree is devoid of duplicate subtrees; and
   determining, based on the nodes in the condensed path tree, references in the condensed path tree, and quantity of nodes in the condensed path tree, a path node tree including a set of path nodes, wherein a quantity of path nodes in the path node tree is one less than a quantity of nodes in the condensed path tree.

* * * * *